United States Patent Office 3,000,663
Patented Sept. 19, 1961

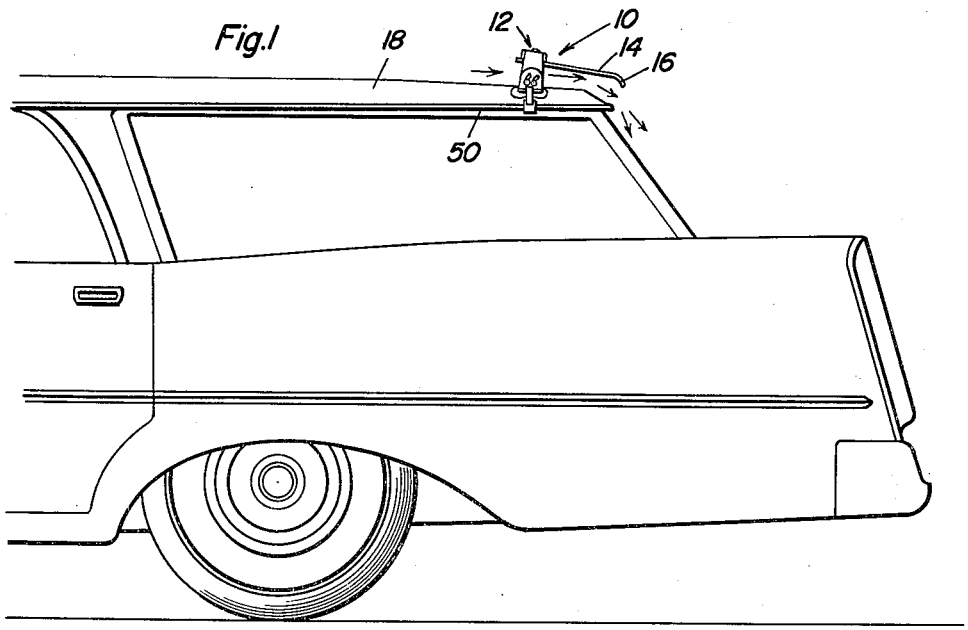
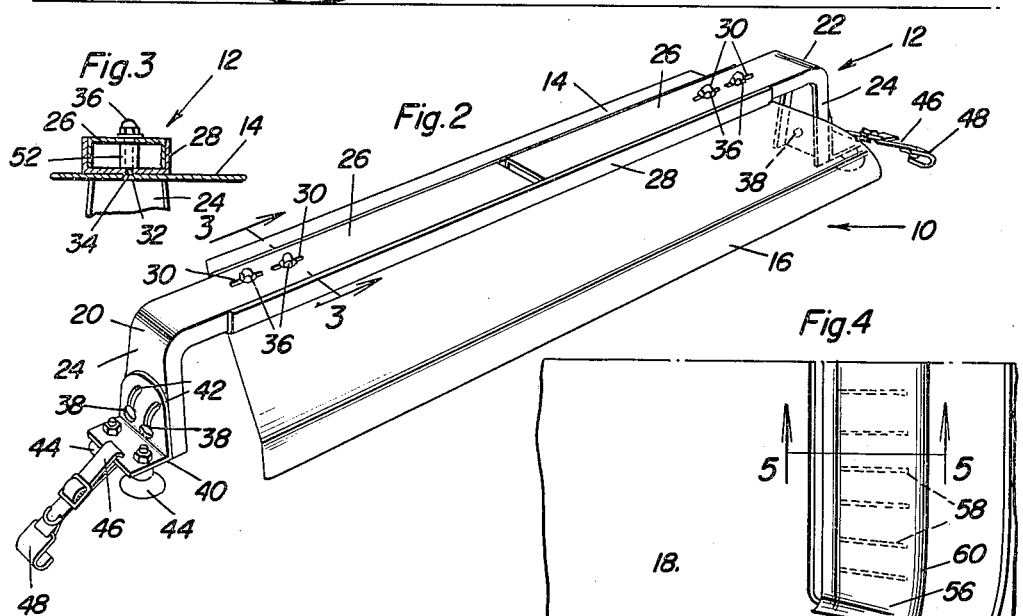
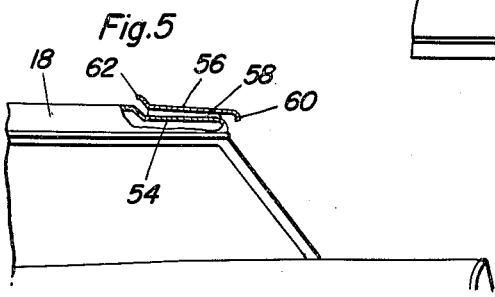
Geno J. Lucchesi
INVENTOR.

3,000,663
VEHICLE AIR DEFLECTOR
Geno J. Lucchesi, P.O. Box 247, South Range, Mich.
Filed June 23, 1959, Ser. No. 822,316
3 Claims. (Cl. 296—1)

This invention relates to a new and useful air deflector, and more particularly to an air deflector adapted to be secured to the rear portion of a vehicle top and at a space distance therefrom and of such configuration as to deflect downwardly a sufficient amount of air to reduce the partial vacuum behind the top when the vehicle is in forward motion.

The function of the air deflector minimizing the partial vacuum created behind a vehicle as it is traveling forward eliminates the accumulation of snow, mud or dirt on most or all of the rear of the vehicle to which the air deflector is attached, including the rear window and clears the rear portion of the vehicle of any loose snow or other material that settles thereon while the vehicle is parked, as well as the entrance of exhaust gases through the open rear window of stationwagons and the like.

Many drivers have experienced the inconvenience of driving in snow and having snow accumulate on the rear window necessitating that the driver stop his vehicle and remove the snow in order that he may be afforded vision through the rear window. Also, when driving on wet streets or highways the vacuum formed behind a moving vehicle is sufficient to cause a portion of the dirty or muddy water being thrown backward by the wheels to be thrown against the rear window of stationwagons, panel trucks and the other large bodied vehicles.

The main object of this invention is to provide an air deflector that may be either removably secured to the rear portion of a vehicle top or formed as an integral part thereof that will deflect air downwardly behind the top in sufficient amounts to reduce the vacuum created therebehind when the vehicle is moving in a forward direction so as to eliminate the accumulation of water, snow, or exhaust fumes behind the vehicle.

A further object, in accordance with the preceding object, is to provide a means for mounting the air deflector across the rear portion of a vehicle top in such a manner that the inclination of the air deflector may be adjusted, adapting it for use with substantially every type of vehicle.

Yet another object, in accordance with the preceding objects, is to provide a mounting means for the air deflector that may be adjustable in length so as to readily adapt the deflector to vehicles having tops of varying widths.

A final object to be specifically enumerated herein is to provide a vehicle air deflector that will lend itself to conventional forms of manufacture, be of simple construction, and be economically feasible so as to be readily available to substantially every vehicle owner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary side elevational view of a vehicle shown with the air deflector comprising the present invention secured to the rear portion of the top thereof;

FIGURE 2 is an enlarged perspective view of the air deflector showing the manner in which it is secured to the vehicle and adjusted in positions relative thereto;

FIGURE 3 is a fragmentary vertical transverse sectional view taken substantially upon a plane indicated by the section line 3—3 of FIGURE 2 showing the manner in which the deflector panel and channel member are secured to the supporting frame;

FIGURE 4 is a fragmentary top plan view of a modified form of the air deflector showing the manner in which it may be constructed as a permanent part of a vehicle; and FIGURE 5 is a vertical transverse sectional view of the air deflector taken substantially upon the plane indicated by the section line 5—5 of FIGURE 4.

With attention now drawn more particularly to FIGURES 1 and 2 of the drawings, the numeral 10 generally designates the air deflector of the instant invention comprising a frame generally designated by the reference numeral 12 having an air deflector panel 14 adjustably secured thereto. The latter may be constructed of any suitable sheet like material and is provided with a downwardly curved rear edge portion 16 which is adapted to overlie the rear of a vehicle top 18.

The frame 12 is substantially inverted U-shaped in configuration and comprises a pair of L-shaped leg frame members 20 and 22. Each L-shaped frame member has a vertically disposed shorter leg 24 and a horizontally disposed longer leg 26. The longer legs 26 are positioned in alignment with each other slidingly disposed within upwardly opening channel member 28. Each of the legs 26 is provided with a pair of aligned slots 30. The air deflector panel 14 is provided with two pairs of apertures 32 which are in alignment with apertures 34 formed in the bight portion of the channel member 28. The aligned apertures 32 and 34 are in alignment with slots 30 and fasteners 36 are removably secured through the aligned apertures and slots.

Each leg 24 has removably secured thereto by means of fasteners 38 an angle fixture 40 which is provided with a pair of arcuate slots 42 through which the heads of fasteners 38 extend. The arcuate slots 42 are formed in one leg of each of the angle fixtures 40, the other leg of each having a plurality of suction cups 44 secured thereto for engagement with top 18 and having one end of an adjustable strap 46 secured thereto which has a hook member 48 on the other end thereof adapted to engage the conventional form of rain gutter 50 which extends along each side of most vehicle tops.

With attention drawn now more particularly to FIGURE 3, it will be noted that each leg 26 is U-shaped in cross-section and lies within channel member 28 and that there is provided a plurality of cylindrical spacers 52 through which fasteners 36 extend so as to enable sufficient tension to be exerted by fasteners 36 without buckling or otherwise deforming either the channel member 28 or the legs 26.

With attention now drawn more particularly to FIGURES 4 and 5, there will be seen a modified form of the vehicle deflector which is adapted to be made a part of the vehicle top. The vehicle top 18 is provided with a transversely extending recess 54 adjacent the rear edge thereof and the deflector panel 56 is positioned in superposed relation thereabove by means of a plurality of fins 58 which are substantially vertical and extend longitudinally of the vehicle top 18. Fins 58 not only serve to support deflector panel 56 but also as to provide directional control of the air passage between the deflector panel 56 is also downwardly curved as at 60, and if desired, the forward edge thereof may be upwardly inclined as at 62 so as to provide a scoop to effect the passage of a greater amount of air between the deflector panel 56 and the top 18.

If it is desired, the side edges of the deflector panel 56 may be spaced from the top 18 or they may be inclined downwardly and secured to the top 18 to afford a more pleasing outward appearance.

In operation, the L-shaped legs 26 are first adjusted relative to each other within channel member 28 so as to adapt the frame 12 to the width of the vehicle, and then the suction cups 44 may be engaged with the top 18 so as to position the air deflector 10 thereon. Hooks 48 are then engaged with gutters 50 whereupon straps 46 are adjusted in length so as to provide the necessary tension to retain the deflector 10 in position upon the top 18. If it is required, fasteners 36 may be loosened to longitudinally adjust the deflector panel 14 relative to frame 12, after which adjustment fasteners 30 are lightened so as to retain the deflector panel in position relative to the top 18. If it is desired to either increase or decrease the inclination of the deflector panel 14 fasteners 38 may be loosened so that the frame 12 may be inclined.

It is to be understood that any suitable form of fastener (not shown) may be used to more permanently secure the hook members 48 to the appropriate rain gutters. For example, metal screws could be passed through suitable apertures formed in the hook members 48 and threadedly engaged in suitable apertures formed in the rain gutters 50. If the rain gutters are so provided, the fastener could be engaged in the weep holes therein.

Thus it can be seen that herein described is a vehicle air deflector readily adaptable to be positioned upon vehicles of various sizes and shapes and air deflector that may be adjusted in position on a vehicle to either increase or decrease the amount of air deflected thereby downwardly behind the moving vehicle.

The foregoing is considered as illustrative only of the principles of the invention. Futher, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A vehicle air deflector comprising a frame, securing means on said frame for removably securing it to the rear portion of a vehicle top extending transversely thereacross, an air deflector panel, means mounting said air deflector panel on said frame a spaced distance from said body in a substantially horizontal position with the rear edge thereof adjacent the rear of said top, said rear edge inclined downwardly a sufficient amount to direct a substantial flow of air downward behind the rear of said top reducing the partial vacuum therebehind when the vehicle is in forward motion, said frame comprising two substantially L-shaped frame members positioned with a leg of one frame member aligned with the corresponding leg of the other leg member, a channel member, and means securing and adjustably positioning longitudinally each of said legs within said channel member.

2. The combination of claim 1 including means for adjusting the position of said panel longitudinally along said frame.

3. The combination of claim 1 including means for adjustably inclining said panel.

References Cited in the file of this patent

UNITED STATES PATENTS

| | | |
|---|---|---|
| 868,279 | Little | Oct. 15, 1907 |
| 1,543,877 | Saunders | June 30, 1925 |
| 1,584,275 | Chalkley | May 11, 1926 |
| 2,087,651 | Mygland | July 20, 1937 |
| 2,199,883 | Ishiwata | May 7, 1940 |
| 2,361,924 | Boynton | Nov. 7, 1944 |
| 2,919,952 | Riddle et al. | Jan. 5, 1960 |
| 2,933,344 | Shumaker | Apr. 19, 1960 |

FOREIGN PATENTS

| | | |
|---|---|---|
| 809,998 | Germany | Jan. 19, 1953 |